United States Patent Office 2,773,875
Patented Dec. 11, 1956

2,773,875
INDOLE DERIVATIVES AND METHOD FOR PRODUCING SAME

Jacob Finkelstein, East Paterson, and John Lee, Essex Fells, N. J., assignors to Hoffmann-La Roche Inc., Nutley, N. J., a corporation of New Jersey No Drawing. Application March 28, 1952,
Serial No. 279,255

10 Claims. (Cl. 260—293)

This invention relates to the production of 3-(1-methyl-2-piperidylmethyl)indole and the acid addition salts thereof. The novel compounds are oxytocics, having activity related to that of the ergot alkaloids, for example, ergometrine.

The 3-(1-methyl-2-piperidylmethyl)indole can be prepared in the following manner: The sodium salt of ethyl β-(2-pyridyl)ethylacetoacetate I is reacted with diazotized aniline to form ethyl α-keto-γ-(2-pyridyl)butyrate phenylhydrazone II. The latter compound in the form of its hydrochloride is then heated in the presence of sulfuric acid to produce ethyl 3-(2-pyridylmethyl)-2-indolecarboxylate III which is saponified to form 3-(2-pyridylmethyl)-2-indolecarboxylic acid IV. The latter is then decarboxylated to form 3-(2-pyridylmethyl)indole V which is quaternized with a methylating quaternizing agent, for example, methyl iodide, to form the corresponding 2-(3-indolylmethyl)-1-methylpyridinium salt VI. The last mentioned compound is catalytically reduced to produce 3-(1-methyl-2-piperidylmethyl)indole VII. The free base thus obtained can be readily converted to the desired acid addition salts by treatment with any appropriate acid. Thus, on treating the free base with hydrogen chloride, 3-(1-methyl-2-piperidylmethyl)-indole hydrochloride is obtained.

The following scheme will serve to represent the reactions involved in the preparation of the novel compounds:

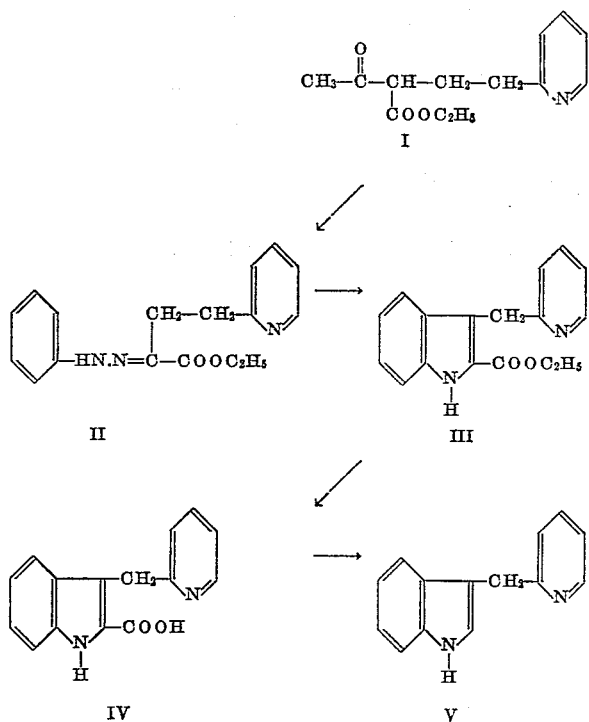

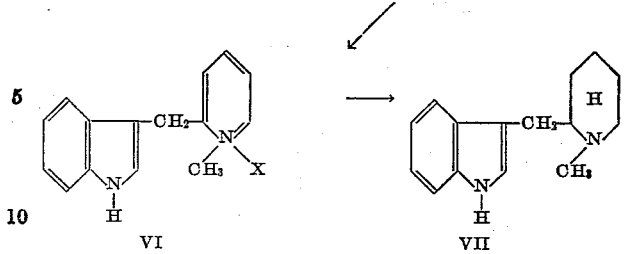

X in Formula VI is a salt-forming anion.

The following examples will serve to illustrate the preparation of the various intermediates as well as 3-(1-methyl-2-piperidylmethyl)indole. The novel intermediates are also embraced within the scope of the invention. It is to be understood that the invention also embraces the compounds in their various stereoisomeric forms, and the claims are to be thus construed.

EXAMPLE 1

*Ethyl α-keto-γ-(2-pyridyl)butyrate phenylhydrazone*

The following solutions were prepared: A. 23.5 grams of aniline in 316 cc. of 2 N hydrochloric acid were diazotized with a solution of 17.3 grams of sodium nitrite in 240 cc. of water at 0–5° C. B. 3.5 grams of sodium were dissolved in 110 cc. of alcohol and cooled to 0° C. To the resulting solution were added 36 grams of ethyl β-(2-pyridyl)ethylacetoacetate. Then, while solution B was being stirred at 0° C., solution A was added dropwise, while slowly maintaining the reaction temperature at approximately 2° C. After a short time, the reaction mixture became turbid and then an oil formed. The addition was completed in 1 hour, and as the stirring was continued, a crystalline product was produced. After setting at room temperature for about 16 hours, the reaction mixture was made alkaline with 300 cc. of N sodium hydroxide. The free base, ethyl α-keto-γ-(2-pyridyl)butyrate phenylhydrazone, thus formed was extracted with ether, washed, dried, and saturated with dry hydrogen chloride. The crystalline ethyl α-keto-γ-(2-pyridyl)butyrate phenylhydrazone hydrochloride thus obtained was further purified by recrystallization from alcohol. The colorless crystals melted at 196–197° C.

Ethyl α-keto-γ-(2-pyridyl)butyrate phenylhydrazone hydrochloride (10 grams) was hydrolyzed with a solution of sodium hydroxide (1.5 grams) in 85% alcohol to produce α-keto-γ-(2-pyridyl)butyric acid phenylhydrazone, which was obtained as a yellow crystalline compound. On recrystallization from toluene, it melted at 160–160.5° C. with decomposition.

EXAMPLE 2

*Ethyl 3 - (2 - pyridylmethyl) - 2 - indolecarboxylate hydrochloride*

8 cc. of concentrated sulfuric acid were added dropwise to a stirred solution of 12 grams of ethyl α-keto-γ-(2-pyridyl)butyrate phenylhydrazone hydrochloride in 40 cc. of acetic acid. The temperature gradually rose to 41° C. during the 10 minutes required to complete addition. The dark reaction solution was then warmed on the steam bath for 1 hour and became lighter in color. After cooling, the solution was poured onto excess crushed ice and made alkaline with a 30% sodium hydroxide solution. This produced an almost colorless semicrystalline product which was extracted by ether. After washing and drying, the addition of a small amount of alcoholic hydrogen chloride led to the formation of a yellowish tinged crystalline substance which was recrystallized from alcohol. The ethyl-3(2-pyridylmethyl)-2-indolecarboxylate hydrochloride thus obtained melted at 220–221° C. The free base was obtained by crystallizing a sample of the above mentioned almost colorless semicrystalline product from ligroin (B. P. 100° C.), M. P. 129–129.5° C.

EXAMPLE 3

*3-(2-pyridylmethyl)-2-indolecarboxylic acid*

A solution of 5 grams of ethyl 3-(2-pyridylmethyl)-2-indolecarboxylate hydrochloride in 35 cc. of alcohol and 33.3 cc. of N sodium hydroxide were refluxed for 4 hours and most of the alcohol removed by distillation. Upon acidification with dilute hydrochloric acid, 3-(2-pyridylmethyl)-2-indolecarboxylic acid was obtained as a colorless crystalline substance which was recrystallized from alcohol, M. P. 215–217° C.

EXAMPLE 4

*3-(2-pyridylmethyl)indole*

An intimate mixture of 33 grams of 3-(2-pyridylmethyl)-2-indolecarboxylic acid, 100 grams of resorcinol, and 1 gram of copper powder was heated gently. At about 200° C. carbon dioxide began to be evolved and was complete at 245° C. The resulting melt was permitted to cool to 100° C. and 250 cc. of cold water were added and the mixture was stirred. The water was decanted and the residue dissolved in chloroform. The extract was washed and dilute sodium bicarbonate solution, water, and then extracted with 5% hydrochloric acid. The acid solution was shaken with ether, the ether extract was discarded, and the residual acid solution then made alkaline with dilute sodium hydroxide solution. A solid product was obtained. The product can be purified by recrystallization from either 50% alcohol or acetonitrile, or by sublimation in vacuo. The thus obtained 3-(2-pyridylmethyl)indole melted at 103–104° C.

EXAMPLE 5

*2-(3-indolylmethyl)-1-methylpyridinium iodide*

A solution of 7 grams of 3-(2-pyridylmethyl)indole, 10 cc. of methyl iodide, and 20 cc. of alcohol was warmed on the steam bath under reflux for 4 hours. The crystalline product thus obtained was left standing at 0° C., filtered, and recrystallized from alcohol. The 2-(3-indolylmethyl)-1-methylpyridinium iodide thus obtained had a M. P. of 189–192° C.

EXAMPLE 6

*dl-3-(1-methyl-2-piperidylmethyl)indole hydrochloride*

A suspension of 10.8 grams of 2-(3-indolylmethyl)-1-methylpyridinium iodide in 200 cc. of 95% alcohol was shaken at 50° C. under 200 lbs. pressure per square inch of hydrogen in the presence of 100 mg. of platinum oxide catalyst. The reduction was complete after 4 hours. After cooling, filtering the reaction medium from the catalyst, and concentrating in vacuo from a water bath, an amorphous residue was obtained, comprising dl-3-(1-methyl-2-piperidylmethyl)indole hydriodide. Water was added, and the hydriodide was converted into the free base with excess sodium hydroxide solution. The free base, dl-3-(1-methyl-2-piperidylmethyl)indole was obtained as an oil. It was taken up in ether, washed with water, and dried first over potassium carbonate and then over potassium hydroxide, and then saturated with dry hydrogen chloride at 0° C. A non-hygroscopic colorless hydrochloride was obtained. Recrystallization from alcohol yielded dl-3-(1-methyl-2-piperidylmethyl)indole hydrochloride, M. P. 228–230° C.

We claim:

1. A process which comprises reacting the sodium salt of ethyl β-(2-pyridyl)ethylacetoacetate with diazotized aniline so as to produce ethyl α-keto-γ-(2-pyridyl)butyrate phenylhydrazone, heating the latter in the form of its hydrochloride in the presence of sulfuric acid to produce ethyl 3-(2-pyridylmethyl)-2-indolecarboxylate, saponifying the hydrochloride of the last mentioned compound to produce 3-(2-pyridylmethyl)-2-indolecarboxylic acid, decarboxylating the latter in the presence of copper to produce 3-(2-pyridylmethyl)indole, reacting the last mentioned compound with a methylating quaternizing agent to produce the corresponding 2-(3-indolylmethyl)1-methylpyridinium salt, and catalytically reducing the latter to produce 3-(1-methyl-2-piperidylmethyl)indole.

2. A process in accordance with claim 1, wherein the methylating agent is methyl iodide.

3. The process which comprises reducing 2-(3-indolylmethyl)1-methylpyridinium iodide in the presence of a metallic oxide catalyst to produce 3-(1-methyl-2-piperidylmethyl)indole.

4. 3-(2-pyridylmethyl)indole.

5. 2-(3-indolylmethyl)-1-methylpyridinium salt.

6. 2-(3-indolylmethyl)-1-methylpyridinium iodide.

7. A compound selected from the group consisting of 3-(1-methyl-2-piperidylmethyl)indole and the acid addition salts thereof.

8. 3-(1-methyl-2-piperidylmethyl)indole.

9. 3-(1-methyl-2-piperidylmethyl)indole hydrochloride.

10. 3-(1-methyl-2-piperidylmethyl)indole hydriodide.

References Cited in the file of this patent

FOREIGN PATENTS 673,949   Germany _____ Mar. 31, 1939

OTHER REFERENCES

Craig et al.: JACS, vol. 71, pp. 462–65 (1948).
Brehm et al.: Jour. Org. Chem., vol. 15, pp. 685–87 (1950).
Akkerman et al.: Recueil des Trauvaux Chimiques, vol. 70, pp. 899–916 (November 1951).